Aug. 8, 1933.   F. L. HAUSHALTER   1,921,672
BALL MILL LINING
Filed Dec. 21, 1931
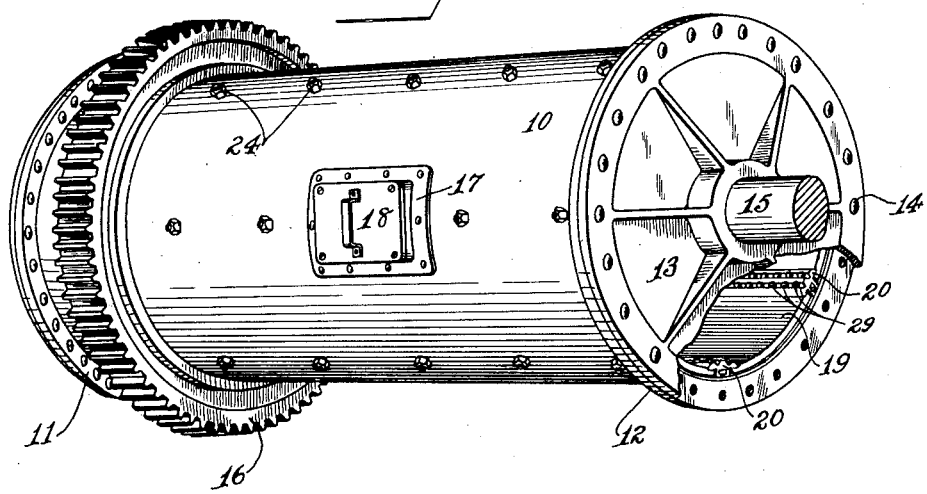
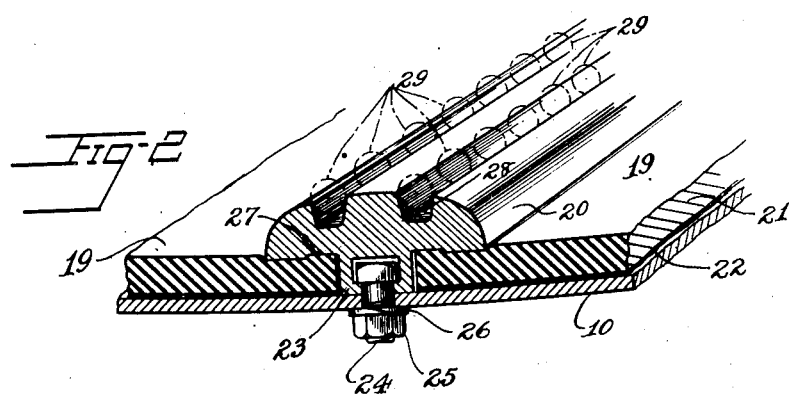
Inventor
Fred L. Haushalter
By Eskin & Avery
Attys.

Patented Aug. 8, 1933

1,921,672

UNITED STATES PATENT OFFICE 1,921,672

BALL MILL LINING

Fred L. Haushalter, Akron, Ohio, assignor to The B. F. Goodrich Company, New York, N. Y., a Corporation of New York Application December 21, 1931. Serial No. 582,236

8 Claims. (Cl. 83—9)

This invention relates to linings for ball mills and especially to linings adapted to resist abrasion, corrosion and impact in mills used in grinding cement materials, ores and similar materials.

Ball mills as usually constructed comprise an elongated hollow cylinder which is provided with means for rotating it on its axis, which is usually disposed in a horizontal plane or at a slight angle to the horizontal. The cylinder is partially filled with balls or pebbles and means are provided to feed the material to be ground into the cylinder where it is pulverized or ground by the rolling action and impact of the balls or pebbles on each other and on the walls of the cylinder. The mill may be provided with openings for loading and discharging and may be so constructed that loading and discharge of the product may take place during its rotation. Grinding may be accomplished with the material to be ground in either a dry or a wet state.

Due to the abrasion and impact received by the mill during operation, probably the greatest problem in the design of ball mills has been to provide a replaceable wear surface which would withstand the abrasion and impact over a long period of time, which would be light in weight, which would withstand the corrosive effect of fluids present in the material to be ground, which could be readily and quickly replaced when worn, and which would not contaminate the material being ground.

Early efforts to provide a satisfactory lining were directed to the type of lining in which extreme hardness of the lining was depended upon to solve the problem of wear, and extreme thickness of the lining was depended upon to prevent breakage of the lining and to prolong the period of useful life. This type of lining was found expensive and difficult to replace. The power expended in driving a mill with such a heavy lining was found to be excessive and the capacity of the mill was substantially reduced by the thickness of the lining required.

It was eventually discovered that a mill lined with soft rubber would provide greater resistance to abrasion than one provided with a lining having a relatively hard surface and, being lighter in weight, could be used with a reduction in power and increased mill capacity. This was an important advance in the art but one which involved new difficulties.

A rubber lining having a smooth, cylindrical inner surface does not raise the balls as high as is desirable, with the result that the grinding is accomplished largely by trituration rather than by impact.

If the rubber lining is formed with a ribbed inner surface, on the other hand, weight of the charge and its shifting motion produces tensional stresses in the rubber, the load being sustained by the rubber alone, and the tensioning of the rubber is conducive to rapid wear of the strained portions thereof.

Difficulty was also experienced in maintaining the lining in place in the cylinder, especially where linings were applied to mills which had previously been used.

Attempts have been made to provide for high lifting of the balls by the use of metal flights or cleats attached over the rubber lining, but the rapid wear of the metal bars in such a construction requires frequent and expensive shut downs for repairs.

The principal objects of the present invention are to relieve the rubber of tensional stresses, to provide a composite lining having a long period of useful life, to provide adequate lifting of the balls, to provide increased abrasion resistance to the rubber, and to provide for securely fastening the rubber to the cylinder.

Other objects will appear from the following description and the accompanying claims.

In the drawing, Fig. 1 is a perspective view of one type of ball mill illustrating the application of the composite lining, parts of the mill being broken away to show the lining in place.

Fig. 2 is a detail view in perspective showing a section of the mill and the lining.

Fig. 3 is an end view of one of the rubber slabs showing in full lines the condition of the slab when manufactured and in dot and dash lines the condition it assumes when in place in the mill.

Referring to the drawing, the numeral 10 designates the cylindrical metal shell of a ball mill provided with marginal flanges 11 and 12. One of the ends of the cylinder is provided with a head 13 which is fastened to the flange 12 as by bolts or rivets 14 and is provided with a trunnion 15 on which the mill rotates. Similar or other supporting means are provided at the opposite end and a ring gear 16 fixed to the shell 10 provides means for engaging driving gears for rotating the mill about its horizontal axis. A manhole flange 17, riveted over an opening in the side of the shell, and provided with a suitable cover 18, may be provided for filling or discharging the mill. It is understood, however, that the structure described is only illustrative of one type of mill and that the invention is applicable to other types.

The lining comprises alternate slabs of rubber 19 and strips of metal 20 which hold the rubber slabs in place, act as flight bars, and relieve the rubber lining of tensional stresses.

The slabs 19 are preferably made to extend the full length of the cylinder and each comprises a thick layer of abrasion-resistant vulcanized rubber compound 21 and a stiff inextensible backing 22 of one or more layers of fabric impregnated or coated with semi-hard rubber composition and vulcanized integrally with the layer 21 in the form of a flat slab as illustrated in the full line position in Fig. 3. After vulcanization the slab 19 is cut to such a width as to extend between two of the bars 20 when curved to the radius of the shell 10. This curving of the slab is preferably done as the slab is assembled in the shell with the bars 20. The rubber face layer 21 being resilient and the backing 22 being slightly flexible but practically inextensible, the layer 21 is placed under compression by the curving of the sheet and therefore provides a wear surface of material more abrasion-resistant than the unstressed rubber compound.

The combination clamping and flight bars 20 are substantially T-shaped and are preferably made of manganese steel or other metal having a high abrasion resistance. The stem 23 of the T-section is preferably provided with a T-slot throughout its length for receiving the heads of machine bolts 24 which pass through openings in the shell 10 and are provided with nuts 25 and lock washers 26. The T-slot construction provides for fastening the bar in position irrespective of inaccuracies in the spacing of the bolt holes.

The underside of the shoulders formed by the head of T-section are rebated as at 27 and the length of the stem 23 is such that when the bolts 24 are drawn tight the bottom of the stem will impinge against the shell 10 and the margins of the slabs 19 will be compressed by an amount at least equal to the depth of the rebate 27. This construction provides clamping of the slab beyond its edge by a predetermined amount and interlocking of the rubber slab and the metal bar while at the same time providing positive clamping of the bar to the shell, the construction being such that the weakening of the shell by drilling of the bolt holes is compensated for by the reinforcement of the shell by the bar. The rigid clamping of the bars and the shell enables the shell to carry the lifting load directly on the bars and thereby relieves the rubber from tensional strains. It also prevents relative movement of the bars and the shell and wear on the fastening bolts. As each bar 20 extends throughout the length of the shell 10 and positively contacts with each slab throughout its length it prevents the entrance of slurry and pulverized material between the longitudinal margins of the slabs.

The heads of the bars 20 are formed on their exposed surfaces to engage and retain a quantity of grinding balls, preferably by providing grooves 28 having a depth at least greater than half the diameter of the balls used in the mill and defined by non-parallel sides whose outer margins are spaced by a distance slightly greater than the diameter of the balls and whose sides converge toward the bottom of the grooves at such an angle that a slight force imposed on a ball resting in the groove in a direction toward the bottom of the groove will cause such frictional engagement of the ball by the inclined walls of the bar as to cause the ball to be retained therein during rotation of the drum. As the mill is rotated a substantial number of the balls 29 will lodge in the grooves and be firmly wedged therein by the superimposed load of material and balls in the mill, thereby providing a row of balls extending above the face of the bar, which therefore form a renewable wearing face for the bar. As the projecting faces of the balls become worn and the worn balls are rotated in respect to the groove by off-center impact of other balls against their exposed flattened faces, they become dislodged from the groove and other balls become lodged therein. It will be seen that by this automatic replacement the retainer bars are from time to time provided with new projecting portions which prevent undue wear of the bars and that the extent of the bars above the shell, including the retained balls, is substantially constant so that the lifting or throwing effect of the retaining and lifting bars in relation to the rubber lining is substantially constant.

The provision of a composite lining of this type assures that the major portion of the surface of the mill will be protected with an abrasion-resistant resilient surface under compression and that the remaining portion of the lining will be capable of sustaining the lifting load, will maintain a uniform lift, and will resist abrasion so that the operation of the mill will be uniform throughout the life of the lining.

What I claim is:

1. The combination of a ball mill and an abrasion-resistant lining therefor, said lining comprising spaced longitudinal slabs of resilient rubber material having the major portions of their faces exposed to abrasion and their longitudinal margins clamped to the shell of the mill by bars fastened thereto, said bars being formed to engage and retain a quantity of grinding balls to maintain the elevation of the flights above the rubber surface during the operation of the mill.

2. A combination as defined in claim 1 in which the slabs of rubber material have their exposed surfaces under compression.

3. A combination as defined by claim 1 in which the bars are formed with longitudinally extending V-grooves.

4. The combination of a ball mill and a rubber lining therefor comprising circumferentially separated slabs having the major portion of their faces exposed and each extending longitudinally of the mill and a T-shaped clamping and flight bar having means for clamping it to the mill between adjacent slabs, said slabs having their longitudinal margins underlying the arms of the bar, said bar being formed to engage and retain a quantity of grinding balls to maintain the elevation of the flight bar above the rubber lining during the operation of the mill, the stem of the bar being of such depth that when the bar is clamped in rigid relation to the mill the marginal portions of the slabs are compressed.

5. A combination as defined in claim 4 in which the arms of the T-shaped clamping and flight bar are rebated on their under sides to interlock with the rubber lining.

6. A combination as defined in claim 4 in which the stem of the T-shaped clamping and flight bar is formed with a longitudinally extending T-slot for engaging clamping bolts for attaching it rigidly to the mill.

7. A combination as defined in claim 4 in which the rubber slabs are provided with an inextensible backing.

8. A combination as defined in claim 4 in which the rubber slabs are provided with an inextensible backing, are normally flat, and have their exposed faces compressed when assembled in the mill.

FRED L. HAUSHALTER.